United States Patent [19]
Lee

[11] 3,982,911
[45] Sept. 28, 1976

[54] PROCESS FOR THE PREPARATION OF A COMPOSITE CUBIC BORON NITRIDE LAYER ABRASIVE BODY

[75] Inventor: Minyoung Lee, Schenectady, N.Y.

[73] Assignee: General Electric Company, Schenectady, N.Y.

[22] Filed: Oct. 18, 1974

[21] Appl. No.: 515,867

Related U.S. Application Data

[63] Continuation-in-part of Ser. No. 302,809, Nov. 1, 1972, abandoned.

[52] U.S. Cl. .................................. 51/307; 51/308; 51/309 R; 51/309 A
[51] Int. Cl.² ..................... B24D 3/06; B24D 3/14; C04B 31/16
[58] Field of Search ............ 423/290; 51/293, 307, 51/308, 309; 264/65, 332

[56] References Cited
UNITED STATES PATENTS

| | | | |
|---|---|---|---|
| 3,407,445 | 10/1968 | Strong................................. | 51/307 |
| 3,469,976 | 9/1969 | Iler....................................... | 264/65 |
| 3,743,489 | 7/1973 | Wentorf et al...................... | 51/307 |
| 3,767,371 | 10/1973 | Wentorf et al...................... | 51/307 |
| 3,850,591 | 11/1974 | Wentorf et al...................... | 51/307 |

Primary Examiner—Donald J. Arnold
Attorney, Agent, or Firm—Jane M. Binkowski; Joseph T. Cohen; Jerome C. Squillaro

[57] ABSTRACT

Cubic boron nitride (CBN) crystals of graded particle size are chemically cleaned and disposed in a protective metal cup together with a mass of substrate source material and a concentration of metal for providing an alloy for infusing and wetting the walls of capillary-size voids. The CBN content is increased in density to greater than 70% by volume and placed within a semi-isostatic system of finely-divided powder. Pressure in the range of from about 20,000 to about 100,000 psi is applied semi-isostatically to the system and thereby to the metal cup and its contents. Heat and pressure are then simultaneously applied to the semi-isostatic system. Liquefied infusing and wetting alloy enters the interstices between the CBN crystals to bond them together. The entire system is cooled and the strong composite body of metal-bonded CBN directly bonded to a substrate is recovered therefrom.

18 Claims, 5 Drawing Figures

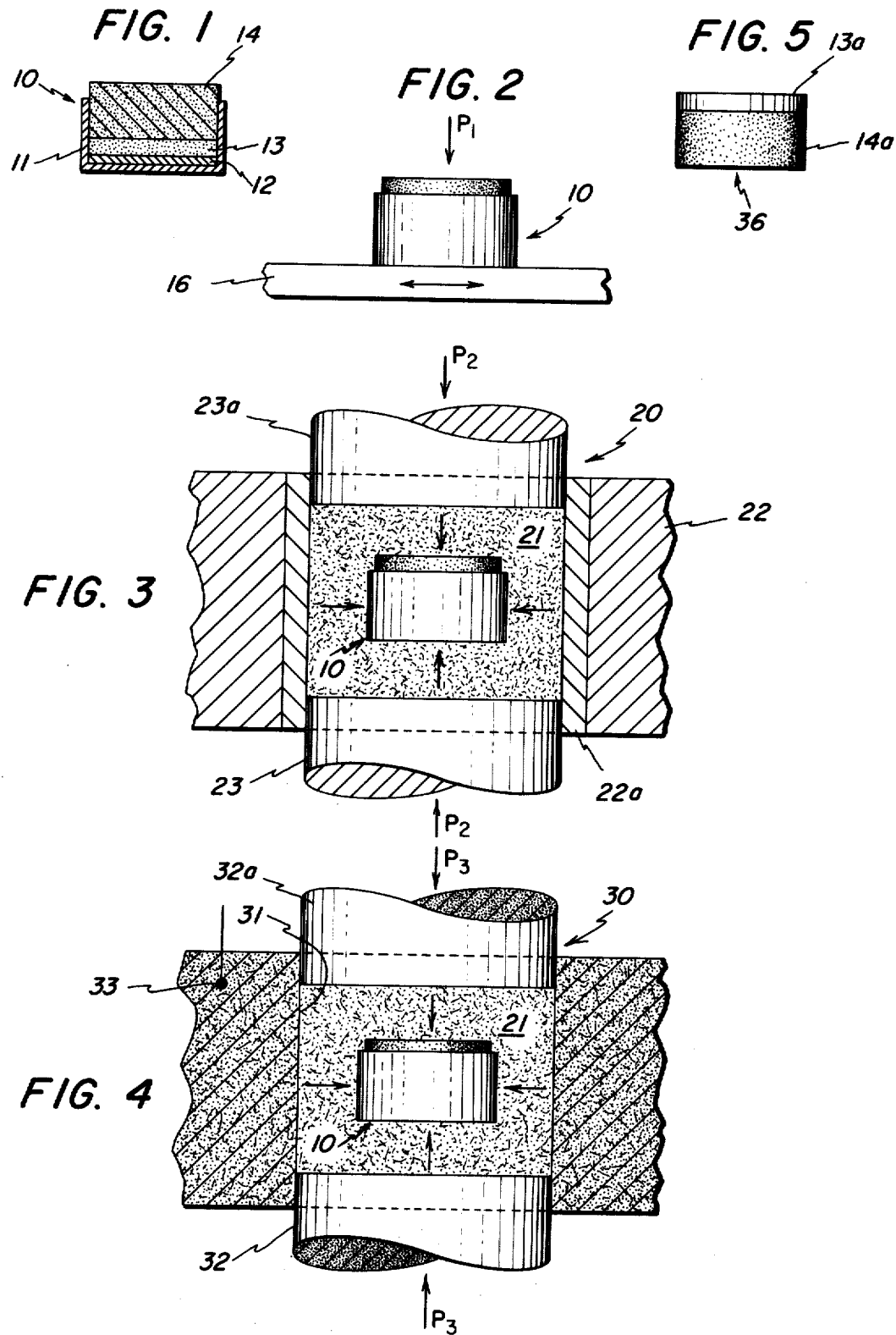

PROCESS FOR THE PREPARATION OF A COMPOSITE CUBIC BORON NITRIDE LAYER ABRASIVE BODY

BACKGROUND OF THE INVENTION

This application is a continuation-in-part of U.S. Pat. application Ser. No. 302,809 - Lee - filed Nov. 1, 1972 and now abandoned.

High temperature, ultra high pressure preparation of tool inserts made of cubic boron nitride crystals bonded to each other and bonded to and supported on a sintered carbide mass wherein particular aluminum alloys are employed as the bonding medium is described in U.S. patent application Ser. No. 158,711 - Wentorf et al. (now U.S. Pat. No. 3,743,489), filed July 1, 1971 and assigned to the assignee of the instant invention. The metals for alloying with the aluminum are selected from the group consisting of nickel, cobalt, manganese, iron, vanadium and chromium. The temperatures employed are in the range of from about 1300°–1600°C and the pressures employed are of the order of 55 kbs.

The tool inserts produced by these superpressure techniques are a unique and very valuable contribution to the machining art, however, it would be most desirable to develop low (relative to the superpressures) pressure techniques for the preparation of composite bodies of metal-bonded CBN directly bonded to a substrate.

SUMMARY OF THE INVENTION

Cubic boron nitride (CBN) crystals of graded particle size are chemically cleaned and disposed in a protective metal cup together with a mass of substrate source material and a concentration of metal for providing an alloy for infusing and wetting the walls of capillary-size voids. The substrate source material is selected from the group consisting of (a) carbide powder containing metal bonding agent, (b) metal bonded carbide and (c) substrate metal meeting particular criteria. The alloy-providing metal may be either a preformed alloy or a plurality of alloy-forming metal components. The CBN content is increased in density (as by vibration of the metal cup and its contents under light pressure application) to greater than 70% by volume, after which the metal cup is placed within a finely-divided particulate semi-isostatic pressure transmitting system, e.g. very fine hexagonal boron nitride powder. Pressure in the preferred range of from about 20,000 to about 100,000 psi is applied semi-isostatically to the system to dimensionally stabilize the metal cup and its contents. The semi-isostatic system containing the metal cup and its contents is then transferred from the pressure mold to a heating mold. Heat (up to about 1500°C) and pressure (e.g. about 10,000 psi) are simultaneously applied to the semi-isostatic system in order to exceed the critical wetting temperature of the infusing and wetting alloy (performed or made in situ). The molten alloy enters capillary-size interstices between the CBN crystals to bond them together. The CBN crystals also become directly bonded to the substrate e.g. a sintered carbide mass, some of which material is forced in between CBN crystals at the substrate/CBN interface. The semi-isostatic system is cooled and the strong composite CBN/substrate body is recovered therefrom.

The terms "sintered carbide", "metal bonded carbide" and "cemented carbide" are interchangeable terms all referring to the product resulting from the sintering of a mixture of carbide powder and powdered metal bonding agent.

"Critical wetting temperature" is defined herein as the temperature at which a molten metallic system will infuse into a clean capillary-size passage wettable by the molten metal.

BRIEF DESCRIPTION OF THE DRAWING

The exact nature of this invention as well as objects and advantages thereof will be readily apparent from consideration of the following specification relating to the annexed drawing in which:

FIG. 1 is a cross-sectional view of a cell for accomplishing metal infusion according to this invention;

FIG. 2 schematically represents apparatus for applying light pressure to the cell of FIG. 1 while the cell is being vibrated to increase the density of the mass of CBN crystals;

FIG. 3 is a sectional view through an apparatus for applying semi-isostatic pressure to the cell in a finely-divided particulate mass;

FIG. 4 is a sectional view through a graphite mold for the simultaneous application of heat and pressure to the semi-isostatic system and the cell enclosed therein and FIG. 5 is an elevational view of a composite CBN/substrate body prepared according to this invention.

MANNER AND PROCESS OF MAKING AND USING THE INVENTION

In the preparation of composite abrasive bodies, e.g. according to this invention in which a mass of CBN crystals is a) internally bonded together by an alloy system and b) directly bonded to a substrate source mass, the CBN layer may contain greater than 70% by volume (as much as about 80% by volume) of cubic boron nitride. It is preferred that the CBN crystals be less than 20microns in largest dimension, although the range of particle sizes may, for sound CBN crystals extend even higher e.g. 40–100 microns.

The substrate body to which the CBN layer is directly bonded may be metal bonded carbide (initially provided either as carbide powder containing metal bonding agent to be sintered in situ or as a preformed shape) or may be, or may have a surface of, metal having a linear thermal expansion coefficient (LTEC) of less than about $10 \times 10^{-6}$ inch per inch degree Centigrade and having a melting point (at the operating pressure) greater than the operating temperature. Thus, if desired, by metal disposed adjacent the CBN crystal may serve as a surface of a multi-component substrate source mass. In a multi-component substrate source such as a metal meeting the above criteria of thermal expansion and melting point will serve as a transition layer. The balance of the multi-component substrate source mass may be a material having an LTEC significantly exceeding $10 \times 10^{-6}$ inch/inch °C, but meeting the melting point criterion. Manifestly, the metal used as substrate source or as transition layer in an assembly to yield a multi-component substrate should be chemically compatible with the CBN in that it will bond thereto, but not react extensively therewith. Elementary metals or alloys that form stable nitrides or borides constitute the general class from which the substrate metal may be selected. In particular, molybdenum, niobium, platinum, chromium, vanadium, tungsten, tantalum, titanium, silicon, rhodium, ruthenium and zirconium are representative of metals that may be used either as elemental metals or in alloy form, i.e. alloyed with one or more metals in the group and/or with one or more metals not listed.

Thus, according to this invention a composite abrasive body is formed wherein a mass of metal-bonded CBN is bonded to a layer of metal serving as the sole substrate or as the transition layer portion of a multi-component substrate. The portion of a multi-component substrate that interfaces with the transition layer may be a ceramic, such as alumina, or an elemental metal or alloy.

Metal bonded carbide for use in this invention is prepared from sinterable carbide molding powder (mixture of carbide powder and powdered metal bonding agent, preferably selected from the group consisting of cobalt, nickel or iron). The carbide portion of the molding powder is preferably selected from the group consisting of tungsten carbide, titanium carbide, tantalum carbide and mixtures thereof (although other carbides may be added to obtain special properties). Cobalt is preferred as the sintering metal for the carbide molding powder. The composition of carbide molding powder useful in the practice of this invention may consist of mixtures containing about 75–97% by weight carbide and about 3–25% by weight cobalt. Preferred sinterable carbide molding powders both for in situ sintering and for the preformed substrate according to this invention are Carboloy grades 883, 55A and 55B.

In the arrangement shown in FIG. 1, cell assembly 10 consists of metal cup 11 (right circular cylindrical wall with bottom) of a metal selected from the group consisting of zirconium, titanium, tantalum, tungsten and molybdenum. Within cup 11 are disposed a disc 12 of an alloy, a mass 13 of CBN crystals and a thick plug 14 of a substrate source material, e.g. a cylinder of metal bonded carbide fitting closely into cup 11 and acting as a closure therefor. Other arrangements for positioning these components in cup 11 may, however, be employed.

The CBN crystals should be size-graded to contain very small, medium size and larger crystals, where the full size range will preferably extend from less than 1 micron to about 20 microns. The graded CBN particles should constitute about 60–80% by volume of particles at the larger end of the range of sizes, about 5 to 10% by volume of particles of the medium size with the balance constituting the very small particles.

Prior to being introduced into cup 11, CBN particles are chemically cleaned to remove any $B_2O_3$ from the surface thereof. The purpose of supplying size-graded CBN crystals is illustrated by the arrangement in FIG. 2.

Cell 10 is placed on vibrating table 16 and held there under light pressure (about 50 psi) application during the vibration of cell 10 to encourage rearrangement of the CBN particles to fill spaces and decrease void content in order to increase the density of the CBN layer to greater than 70%.

Having accomplished the requisite degree of consolidation (determined by independent testing on the same graded CBN mix in a fixed dimension die), cell 10 is placed in the cylindrical core of pressure mold 20 surrounded by mass 21 of a very fine (about 400 mesh) particles of hexagonal boron nitride. This mass of fine particles provides an approximately isostatic system for the application of pressure to cell 10, whereby the shape and density of the contents of cup 11 will be determined. Thereafter, this shape and density will be retained at least in planes extending through cup 11 parallel to the interface between the infusion and wetting metal layer and the CBN layer for the simultaneous application of pressure and heat thereto. Pressure mold 20 (ring 22 and pistons 23, 23a) may be made of tool steel and, if desired, ring 22 may be supplied with a sintered carbide sleeve 22a as shown to permit the application of pressures as high as 300,000 psi. Once the semi-isostatic system has been established within the confines of piston 23, sleeve 22a and piston 23a, pressure in the range of from about 20,000 to about 100,000 psi is exerted on the semi-isostatic system by the pistons actuated in the conventional manner until the applied pressure becomes stabilized as is done in conventional powder packing technology.

The nature of the hexagonal boron nitride is such that the fine particles will slip over each other and readjust in an approximation of a hydrostatic action in response to the uniaxially applied pressure to exert pressure over the entire surface of cell 10. It is assumed that the applied pressure is transmitted substantially undiminished to the cell 10. The prime purpose of this pressure application is to bring about a consolidation, which action causes the break-up of any existing deposits of oxides, borides, or nitrides on the surfaces (crystals, metals, and substrate source mass) within cell 10. In this manner clean surfaces are exposed to which the molten infusion and wetting alloy (in the subsequent step to be described hereinbelow) will have access to accomplish the requisite wetting action. Simultaneously, the pressure-induced consolidation (like the vibrating action) diminishes the size of the voids to maximize the presence of capillary-size voids in the CBN mass. In addition to creating a favorable crystal disposition to make available the requisite capillary forces for infusion of the alloy bonding material, the reduction in void volume reduces the ultimate metal content of the CBN mass and provides more juxtaposed crystal-to-crystal areas properly located for effective bonding together by the infused metal layer.

After completion of the aforementioned semi-isostatic pressure application, either one of pistons 23, 23a is withdrawn and the consolidated semi-isostatic system 21 is forced out of liner 22a into a hole of identical diameter in graphite mold 30, the transferred semi-isostatic system 21 now being contained within the wall of hole 31 between graphite pistons 32, 32a. Graphite mold 30 is provided with thermocouple 33 to provide an indication of the temperature being applied to the dimensionally-stabilized semi-isostatic system 21. The mold 30, with the semi-isostatic system 21 so contained, is introduced into a conventional hot pressing furnace (not shown) and, while pistons 32, 32a apply a uniaxial pressure ranging from about 500 psi up to about 10,000 psi (or to short of the limit of the strength capabilities of the mold 30) to system 21, the temperature thereof is raised to the critical wetting temperature of the alloy 12.

When the substrate source mass employed is carbide molding powder or a sintered carbide plug, it is preferred that the alloy system have a critical wetting temperature below about 1300°C in order not to drastically change the composition of the substrate source mass by causing too much sintering metal (e.g. cobalt) to exude therefrom into the CBN crystal mass or be lost from the opposite surface.

Under this combined application of heat and pressure some of the substrate source means is forced up between CBN crystals at the interface and simultaneously the melted alloy system becomes infused into mass 13 of CBN crystals by capillary action, if the inter-crystalline voids are sufficiently clean and small. The alloy system must react slightly with the CBN crystals with which it is brought into contact. At the interface between the alloy concentration and the CBN mass this reaction produces borides and/or nitrides, which are refractory (high melting point) in nature. On the onset of melting the application of pressure breaks up the interfacial refractory layer exposing the capillary void system to the molten alloy, after which infusion by capillary action can occur, when the critical wetting temperature of the alloy has been reached. Tests have shown that unless pressure is applied to system 21 when the alloy mass has been rendered molten and the heating to the critical wetting temperature occurs, infusion of the CBN mass by the alloy will not occur. Also, pressure should be maintained during cooling of the system to preserve the dimensional stability of the composite.

It is during this step that it is particularly important that the dimensional stability of cell 10 have been established and maintained in semi-isostatic system 21 both in mold 20 and in graphite mold 30. So long as constant dimensions of the mass within cup 11 is maintained, when the alloy is converted to the liquid state, this liquid will not be able to pass between mass 13 and cup 11 and escape to any significant extent, but will be forced to move through the mass 13 of CBN crystals.

In the heating sequence the critical wetting temperature should be reached quickly and held for at least about 1 minute. Maintenance of this temperature for long periods (e.g. of the order of 30–40 minutes) may be employed to increase the formation of borides and nitrides in the metal-infused CBN mass.

Although eventually the heat and pressure must be simultaneously applied to system 21, depending upon the alloy, it may be of advantage to apply heat before the pressure application or to apply pressure before the initiation of the heating operation.

After completion of the simultaneous heat/pressure operation, cell 10 is removed from the system, cleaned and composite body 36 consisting of substrate 14a and layer 13a of CBN (and infused alloy) bonded directly thereto is recovered.

The alloy metal 12 need not be a preformed alloy, but may consist of separate discs (or a mixture of powders) of the metals to be alloyed in situ. Criteria for the selection of the alloy system to be employed are set forth in part in U.S. Patent application Ser. No. 158,991 - Fontanella, filed July 1, 1971, (now abandoned) and assigned to the assignee of the instant invention. The Fontanella application is incorporated by reference. As stated therein the alloy must have a melting point below about 1500°C, should be capable of reducing any thin $B_2O_3$ glass film that might be coating the CBN crystals and should exhibit a finite but limited reactivity with CBN.

In the practice of this invention, it has been found that the alloy selected should also have a reasonably close match of thermal expansion coefficients with the particular ultimate substrate material interfacing therewith in order to minimize the internal stresses created in composite 36 during manufacture. Such stresses would result in spalling or delamination in the composite producing a useless structure. In addition, the infused alloy, which forms a complex metallic/ceramic system containing (in addition to the alloying components) some boron, nitrogen and oxygen must not be brittle. Brittleness in the bonding system is readily evident during machining tests, because particles of CBN tend to pop out of the composite. Such is not the case when the infused alloy system is properly selected. The most successful alloy systems discovered to date have been aluminum alloys, but even some aluminum alloys tend to be brittle. Among the most successful alloy systems are the following: NiAl (80–90% by weight Ni); CoAl (less than 20% by weight Co); FeAl (less than 15% by weight Fe) and NiCr (less than 25% by weight Cr).

In the case of the use of a preformed infusion and wetting alloy the amount of alloy should range from about 30 to about 60% by volume of the volume of the CBN mass. When combined metals (preferably multilayers of foils) are employed the total volume should be as above and the individual quantities depend upon the desired alloy, e.g. 80 Ni 20 Al. Substantially all of the void space (20–30% by volume) of the CBN mass is filled with infused alloy.

Sizing of the CBN crystals is facilitated by the jet-milling of larger CBN grains. The chemical cleaning of the CBN grains may be accomplished by heating (900°C, 1 hour) in ammonia. Jet-milling of the crystals provides particles of greater strength by eliminating crystal weaknesses. The sound CBN crystals thus provided together with the non-brittle surrounding cushion of infused alloy all backed up by the high elastic modulus layer provide a composite of very high shock resistance.

Silicon nitride powder (or other finely divided stable material that remains unsintered under the operating conditions) may be substituted for the hexagonal boron nitride in providing the semi - or guasi-isostatic surroundings for the cell 10.

The initial semi-isostatic pressure application has been designated as utilizing a pressure in the 20,000–100,000 psi range as a practical expedient, because of the recognized limitations in the strength of simple pistoncylinder pressure apparatus. This particular step of pressure application is not limited to 100,000 psi and even higher pressures still within the cubic boron nitride metastable region may be employed. In contrast to the instant invention the invention in the Wentorf et al patent requires the use of pressures in the cubic boron nitride stable region. However, the instant invention lies in the discovery of a series of steps that may be carried out in relatively unsophisticated, low cost apparatus to produce a high quality, shock-resistant CBN/substrate composite.

The following examples are provided to illustrate the application of the process of this invention to a variety of substrate source materials. The preferred substrate source material is metal bonded carbide, several examples of which are set forth below in illustrating the best mode contemplated.

In each of Examples 1–12 a zirconium sleeve was placed within the molybdenum cup as a scavenger material. Also, a 1 mil thick aluminum disc was placed between the CBN mass and the substrate source material as a secondary source for infusing and wetting alloy. Both the scavenger metal sleeve and the aluminum disc are optional and neither is required.

EXAMPLE 1

A cast alloy disc (88 w/o Al and 12 w/o Ni) weighing 118 mg was placed in a Mo-cup with a zirconium sleeve. About 150 mg of a graded mixture of a jet milled CBN powder was packed on top of this cast alloy disc. An aluminum disc of 1 mil thickness was placed on top of the packed powder. Finally a molybdenum substrate disc (LTEC $4.9 \times 10^{-6}$ inch/inch °C) of 125 mil thickness was placed on top of this aluminum layer. The cup was then packed within hexagonal boron nitride powder and the whole charge was pressed to about 50,000 psi. The pressed assembly was then loaded into a graphite mold and heated to 1300°C. Heating was done with an induction heater, using a nitrogen gas environment, after a sufficient period of evacuation. After keeping the assembly at 1300°C for 6 minutes under about 10,000 psi, the power supply was turned off. The mold was kept under pressure on cooling. A layer about 40 mils thick of cemented CBN was on the surface of the Mo-substrate. The bond between the metal bonded CBN layer and Mo-substrate was excellent.

Example 2

The procedure of Example 1 was repeated with a niobium (LTEC $7.1 \times 10^{-6}$ inch/inch °C) disc 125 mils thick in place of the Mo-substrate. The finished compact showed good bonding between the CBN layer and the niobium substrate.

Example 3

The procedure of Example 1 was repeated with a tantalum disc 125 mils thick (LTEC $6.5 \times 10^{-6}$) in place of the Mo-substrate source. The resulting compact was polished to check the bond at the CBN/Ta interface. The quality of the bond of Ta to CBN was good.

EXAMPLE 4

Example 1 was repeated wth five 20 mil thick platinum discs (LTEC $8.9 \times 10^{-6}$ inch/inch °C) in place of the Mo-substrate. The finished compact showed good bond between the Pt substrate and the CBN layer, the five Pt discs having become unified by diffusion bonding.

EXAMPLE 5

A AISI D-2 tool steel (LTEC $\sim 11 \times 10^{-6}$ inch/inch °C) disc (125 mils thick) was used as a substrate repeating the procedure of Example 1 but the resulting structure was delaminated at the interface. A thin layer of metal bonded CBN was bonded over portions of the steel disc surface.

EXAMPLE 6

A cobalt disc (LTEC $12.3 \times 10^{-6}$ inch/inch °C) 125 mils thick was tested as a substrate source material in a repeat of the procedure of Example 1. The resulting structure failed at the interface.

EXAMPLE 7

A nickel disc (LTEC $13.3 \times 10^{-6}$ inch/inch °C) 125 mils thick was tested as a substrate repeating the procedure of Example 1, but the interface failed.

EXAMPLE 8

An 18 w/o nickel maraging steel disc 125 mils thick (LTEC greater than $10 \times 10^{-6}$ but less than $11 \times 10^{-6}$) was used as a substrate source material in the procedure of Example 1, but the resulting product failed at the interface.

EXAMPLE 9

A Lucalox disc ($Al_2O_3$, 125 mils thick) was used as the substrate source in a repeat of the procedure of Example 1. The resulting structure cracked badly due to poor bonding.

EXAMPLE 10

The procedure recited in Example 1 was repeated except that the 125 mil Mo disc was replaced by a multicomponent substrate source (a 20 mil disc of Mo together with a 125 mil plug of $Al_2O_3$) with the Mo disc disposed between the 1 mil disc of Al and the $Al_2O_3$ plug. The resulting composite abrasive body was polished to check the interface bonding. This examination showed excellent bonding of the Mo transition layer to both the metal bonded CBN layer and the $Al_2O_3$ plug.

EXAMPLE 11

Example 1 was repeated with a 10 mil thick disc of molybdenum placed as a transition layer between a substrate of 18 w/o nickel maraging steel (as used in Example 8) and the 1 mil Al disc. The composite synthesized as such showed delamination in the CBN layer parallel to the interface, but most of the thickness of metal bonded CBN remained over and well-bonded to the surface of the Mo disc. Delamination of this sort can be avoided by using a thinner layer (e.g. 10 mils) of CBN.

EXAMPLE 12

Example 11 was repeated using a molybdenum disc of 10 mil thickness between the 1 mil Al disc and a nickel substrate (same as Example 7). The composite developed a crack in the metal bonded CBN layer parallel to the interface. However, a layer more than 10 mils thick remained soundly bonded as in Example 11.

BEST MODE CONTEMPLATED

The following examples (Examples 13–18) disclose the best mode contemplated, that is, the use of materials, arrangements and manipulative steps resulting in a composite abrasive body in which a layer of metal-bonded CBN crystals is directly bonded to a body of metal bonded carbide. Such a substrate provides a high (in excess of about 60,000,000 psi) elastic modulus backup support for the CBN layer.

EXAMPLE 13

CBN powder was prepared by jet-milling to provide a wide range of particle sizes ranging from submicron sizes to 20 micron size. Four alternating layers of 6 mil thick aluminum discs and 1 mil thick Ni discs were placed in the bottom of a zirconium cup (2 mil thick wall, 350 mil i.d.). About 200 mg of the CBN powder was packed on top of the metal mass and a sintered carbide disc (94 wt. % WC 6 wt. % Co, 125 mils thick LTEC~$10 \times 10^{-6}$ inch/inch °C) was placed on the powder closing off the zirconium cup. The assembly was vibrated for about 1 minute at moderate amplitude at a frequency of about 360 cycles/sec. under an applied pressure of about 35 psi. The assembly was surrounded by hexagonal boron nitride powder (FIG. 3) and cold-pressed to 35,000 psi. Thereafter, the pressed assembly was transferred to a graphite mold (FIG. 4) and heated in a hot pressing furnace to 1250°C. Heating was accomplished in a nitrogen environment after initial evacuation. After holding at the critical wetting temperature of 1250°C for 18 minutes, a pressure of 7500 psi was applied to the charge and heating was continued with the pressure applied for two more minutes. The assembly was kept under pressure during cooling. The resulting composite body had a 50 mil thick layer of CBN crystals bonded to each other and to the surfaces of the carbide disc. A cutting tool (0.235 inch square) was shaped from this composite body and was used in a turning operation on Ni-base superalloy (Inco 718). After 2 minutes of operation at a cutting speed of 200 ft./min., only 11 mils of flank wear was measured.

EXAMPLE 14

A cast alloy disc (88 wt. % Al 12 wt. % Ni) 25 mils thick was placed in the bottom of a molybdenum cup (same dimensions as for the cup in Example 13) having a thin zirconium liner sleeve therein. A layer of a graded mixture (120 mg) of CBN powder (25 wt. % 0–2 $\mu$ size and 75 wt. % 0–20 micron size particles) was placed on top of the metal. A sintered carbide disc (as described in Example 13) was used to cover the CBN powder and close off the metal cup. The assembly was vibrated, packed in hexagonal BN and cold-pressed as in Example 13. The pressed assembly was transferred to a graphite mold preserving its lateral dimension and, in a nitrogen atmosphere, was heated to 1150°C. The assembly was maintained at this critical wetting temperature for 35 minutes. The assembly was kept under 8000 psi pressure throughout the heating process and during the cooling stage. A tool (0.235 inch square) made from the resulting composite body was used to machine chilled cast iron alloy ($R_c$ hardness 68) at 300 ft./min. with a 2.5 mil depth of cut. A total cutting time of 21 minutes under these severe conditions resulted in only 18 mils of flank wear.

EXAMPLE 15

A 20 mil thick disc of cast alloy (88 wt. % Al 12 wt. % Ni) was placed in the bottom of the same protective metal cup arrangement as was employed in Example 14. A layer (170 mg) of a graded mixture of CBN powders (78 wt. % of average 40 $\mu$ size, 12 wt. % of 0–16 $\mu$ size and 10 wt. % of 0–2 $\mu$ size) was distributed over the alloy disc. A sintered carbide disc (as described in Example 13) was placed over the CBN powder closing off the metal cup. The assembly was vibrated and packed in hexagonal BN as in Example 13 and then cold-pressed at about 50,000 psi. The cold-pressed assembly was transferred to a graphite mold as in previous examples and was heated to 1250°C for 40 minutes. A pressure of about 10,000 psi was maintained on the assembly throughout the heating process and during the cooling stage. A tool (0.235 inch square) prepared from the resulting composite body was employed to machine chilled cast iron alloy at 200 sfpm taking a 5 mil depth of cut. After 4 minutes a flank wear of 10 mils resulted. The composite tool was also employed to cut superalloy (Rene 95) at 400 spfm taking an 8 mil depth of cut. After 1 minute 32 seconds of operation only 13 mils of flank wear was found.

EXAMPLE 16

A 25 mil thick disc of cast alloy (90 wt. % Al 10 wt. % Ni) was placed in the bottom of a zirconium cup (2 mil thick wall, 562 mil i.d.). A layer (380 mg) of a blend of size-graded CBN crystals (73 wt. % 5–7 $\mu$ size, 9 wt. % 2–3.5 $\mu$ size and 18 wt. % 0–2 $\mu$ size) was distributed over the top of the alloy disc. A sintered carbide disc (94 wt. % WC 6 wt. % Co, 135 mils thick) was placed over the CBN powder closing off the metal cup. The assembly was vibrated, packed in hexagonal BN and cold-pressed as in Example 13. The pressed assembly was transferred to a graphite mold as in previous examples, heated to the critical wetting temperature (1250°C) and held at this temperature for ½ hour. A pressure of about 10,000 psi was maintained on the system during this heating and during a subsequent cooling step. A cutting tool (⅜ inch square) was shaped from the resulting composite and was subjected to machining that demonstrates the very effective shock resistance of the composite construction produced by the process of this invention. The tool was used for the scale removing operation on a chilled cast iron alloy roll. The cutting edge employed lasted over ½ hour.

EXAMPLE 17

A cemented carbide disc (125 mils thick 87, w/o WC and 13 w/o Co, LTEC~10 $\times$ 10$^{-6}$ inch/inch/ °C) was used as the substrate source material in the procedure of Example 1. The finished composite showed good bonding between the metal bonded CBN and the cemented carbide.

EXAMPLE 18

Example 1 was repeated with carbide molding powder (94 w/o WC and 6 w/o Co) in place of the Mo-substrate. The finished compact showed fully densified cemented WC - Co substrate (80 mils thick) well bonded to the metal bonded CBN layer.

As employed in the following claims the term "substrate metal" is not intended to encompass metal-bonded sintered carbide, but is intended to include alloys having the requisite properties. Also, as is set forth hereinabove the substrate source material may consist of more than one substance, however, the substance adjacent to the CBN crystals must meet the criteria recited. The values of LTEC recited in the specification and claims were obtained near 20°C.

What I claim as new and desire to secure by Letters Patent of the United States is:

1. A process for the preparation of a composite abrasive body comprising the steps of:
  a. placing within a protective metal container (1) a layer of a mass of clean cubic boron nitride crystals, (2) a layer of bonding alloy or metal for providing said bonding alloy for infusing and wetting the clean surfaces of capillary-size voids in said mass of cubic boron nitride crystals, said bonding alloy being a metal alloy having a critical wetting temperature of less than about 1500°C, being capable of reducing $B_2O_3$ and exhibiting a limited finite reactivity with cubic boron nitride, the amount of said bonding alloy ranging from about 30 to 60% by volume of said mass of cubic boron nitride crystals, and (3) a layer of substrate material different from said bonding alloy, said substrate material being selected from the group consisting of (a) metal carbide powder selected from the group consisting of tungsten carbide, titanium carbide, tantalum carbide and mixtures thereof containing sintering metal bonding agent therefor selected from the group consisting of cobalt, nickel, iron and mixtures thereof sinterable at operating temperature and pressure, (b) sintered metal carbide selected from the group consisting of tungsten carbide, titanium carbide, tantalum carbide and mixtures thereof, and (c) metal having a linear thermal expansion coefficient of less than about $10 \times 10^{-6}$ inch per inch degree Centigrade and having a melting point at the operating pressure greater than the operating temperature and being selected from the group consisting of molybdenum, niobium, platinum, chromium, vanadium, tungsten, tantalum, titanium, silicon, rhodium, ruthenium, zirconium and alloys thereof, said substrate being disposed with one side facing said other two layers, b. disposing said metal container and the contents thereof within a finely-divided particulate pressure-transmitting medium that remains unsintered under the operating conditions of temperature and pressure and that transmits applied pressure substantially undiminished, c. applying substantially isostatic pressure to said container and said contents via said pressure transmitting medium, said pressure being greater than about 20,000 psi and significantly less than the pressure at which cubic boron nitride is stable at the operating temperature selected for this step, the application of pressure being maintained at least long enough to substantially stabilize the dimensions of said container and said contents at least in planes through said container parallel to the interface between the layers of bonding alloy or bonding alloy-providing metal and the cubic boron nitride crystals, d. simultaneously applying substantially isostatic pressure to and heating said container and said contents as substantially dimensionally stabilized in step (c), said heating being to a temperature and for a period of time in excess of about one minute to liquefy said bonding alloy or said bonding alloy-providing metal, exceed the critical wetting temperature of said bonding alloy and permit infusion thereof into capillary-size voids in said mass of cubic boron nitride crystals, said pressure being applied via said pressure-transmitting medium and reaching a value between at least about 500psi and a value significantly less than the pressure at which cubic boron nitride is stable at said critical wetting temperature, e. maintaining substantially isostatic pressure on said container and said contents during cooling thereof and f. recovering the resultant composite abrasive body in which a layer of bonding alloy-bonded cubic boron nitride crystals is directly bonded to a substrate.

2. The process of claim 1 wherein the bonding alloy provided is selected from the group consisting of NiAl in an amount of about 80–90% by weight nickel, CoAl in an amount of less than 20% by weight cobalt, FeAl in an amount of less than 15% by weight iron and NiCr in an amount of less than 25% by weight chromium.

3. The process of claim 1 wherein the initial pressure application is conducted in a first apparatus, the metal container and contents and the pressure-transmitting medium are transferred to a second apparatus and the simultaneous application of pressure and heating are conducted in said second apparatus.

4. The process of claim 3 wherein the pressure application in the second apparatus precedes the simultaneous application of pressure and heating.

5. The process of claim 3 wherein the heating in the second apparatus precedes the simultaneous application of pressure and heating.

6. The process of claim 1 wherein the substrate material is metal bonded sintered metal carbide.

7. The process of claim 6 wherein the metal bonded sintered metal carbide is cobalt bonded tungsten carbide.

8. The process of claim 1 wherein the substrate material is a metal carbide powder containing powdered metal bonding agent.

9. The process of claim 8 wherein the carbide powder is tungsten carbide and the metal bonding agent is cobalt.

10. The process of claim 1 wherein the metal container is open on one side, the bonding alloy or the bonding alloy-producing metal is placed in the bottom of said container and the mass of cubic boron nitride crystals is located between said bonding alloy or bonding alloy-producing metal and said substrate material.

11. The process of claim 1 wherein the mass of cubic boron nitride crystals are size-graded, the crystal sizes ranging from sub-micron size to greater than 40 microns.

12. The process of claim 1 wherein the cubic boron nitride content of the layer of metal-bonded cubic boron nitride crystals produced is in excess of 70 percent by volume.

13. The process of claim 1 wherein the substrate material is molybdenum.

14. The process of claim 1 wherein the substrate material is niobium.

15. A composite abrasive body consisting of a layer of bonding alloy-bonded cubic boron nitride crystals directly bonded to a metal substrate having a linear thermal expansion coefficient less than about $10 \times 10^{-6}$ inch/inch °C, said metal substrate being selected from the group consisting of molybdenum, niobium, platinum, chromium, vanadium, tungsten, tantalum, titanium, silicon, rhodium, ruthenium, zirconium and alloys thereof, and the bonding alloy component of said layer of bonding alloy-bonded cubic boron niitride crystals being characterized as a metal alloy having a critical wetting temperature of less than about 1500°C, exhibiting a limited finite reactivity with cubic boron nitride and being capable of reducing $B_2O_3$, said bonding alloy component ranging from about 30 to 60% by volume of the cubic boron nitride crystals.

16. The composite abrasive body of claim 15 wherein the metal substrate is molybedenum.

17. The composite abrasive body of claim 15 wherein a layer of ceramic having a linear thermal expansion coefficient significantly greater than $10 \times 10^{-6}$ inch/inch °C is directly bonded to said metal substrate, said metal substrate being intermediate said layer of bonding alloy-bonded cubic boron nitride crystals and said layer of ceramic.

18. The composite abrasive body of claim 17 wherein the ceramic is alumina.

* * * * *